United States Patent
Nakayama et al.

(10) Patent No.: US 9,027,325 B2
(45) Date of Patent: May 12, 2015

(54) EXHAUST PURIFICATION DEVICE OF INTERNAL COMBUSTION ENGINE

(75) Inventors: Yusuke Nakayama, Gotemba (JP); Yukihiro Sonoda, Suntou-gun (JP); Takaaki Itou, Mishima (JP); Takaaki Kanazawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 125 days.

(21) Appl. No.: 13/807,235

(22) PCT Filed: Jul. 21, 2010

(86) PCT No.: PCT/JP2010/062652
§ 371 (c)(1),
(2), (4) Date: Dec. 27, 2012

(87) PCT Pub. No.: WO2012/011195
PCT Pub. Date: Jan. 26, 2012

(65) Prior Publication Data
US 2013/0101474 A1 Apr. 25, 2013

(51) Int. Cl.
*F01N 3/20* (2006.01)
*F01N 3/08* (2006.01)
(Continued)

(52) U.S. Cl.
CPC ........... *F01N 3/2053* (2013.01); *F01N 3/0814* (2013.01); *F01N 3/0878* (2013.01); *F01N 2560/025* (2013.01); *F01N 3/0842* (2013.01); *F02D 41/0235* (2013.01); *F02D 41/068* (2013.01); *F02M 43/04* (2013.01); *F02D 19/0647* (2013.01); *F02D 19/0655* (2013.01); *F02D 41/0027* (2013.01); *F01N 2410/06* (2013.01); *F01N 2560/06* (2013.01); *F02D 2200/0802* (2013.01); *F02M 43/00* (2013.01); *F02M 61/145* (2013.01); *F02M 2200/95* (2013.01); *F01N 3/0835* (2013.01); *F02D41/0255* (2013.01); *F02P 5/1506* (2013.01); *F02D 19/061* (2013.01); *F02D 19/0689* (2013.01); *F02D 19/0692* (2013.01); *B01J 20/06* (2013.01)

(58) Field of Classification Search
USPC .................................... 60/284, 288, 295, 303
See application file for complete search history.

(56) References Cited

U.S. PATENT DOCUMENTS

| 5,549,083 A | 8/1996 | Feuling |
| 6,397,586 B1 | 6/2002 | Sakurai et al. |

(Continued)

FOREIGN PATENT DOCUMENTS

| DE | 10 2005 021491 | 11/2006 |
| EP | 1 013 902 | 6/2000 |

(Continued)

*Primary Examiner* — Kenneth Bomberg
*Assistant Examiner* — Jonathan Matthias
(74) *Attorney, Agent, or Firm* — Sughrue Mion, PLLC

(57) ABSTRACT

An ambient $NO_x$ adsorption catalyst that can adsorb $NO_x$ contained in an exhaust gas in the presence of CO under standard conditions is placed in an engine exhaust gas passage, in an internal combustion engine. Until an engine post-initiation catalyst is activated, the amounts of a high-boiling-point hydrocarbon and an unsaturated hydrocarbon that are contained in the exhaust gas flowing into the catalyst are reduced so that the $NO_x$-adsorbing activity cannot be deteriorated by the adhesion activity of the hydrocarbons while maintaining the CO concentration in the exhaust gas flowing into the catalyst at a level higher than the concentration required for the adsorption of $NO_x$.

10 Claims, 15 Drawing Sheets

(51) Int. Cl.
    *F02D 41/02*     (2006.01)
    *F02D 41/06*     (2006.01)
    *F02M 43/04*     (2006.01)
    *F02D 19/06*     (2006.01)
    *F02D 41/00*     (2006.01)
    *F02M 43/00*     (2006.01)
    *B01J 20/06*     (2006.01)
    *F02M 61/14*     (2006.01)
    *F02P 5/15*     (2006.01)

(56) References Cited

U.S. PATENT DOCUMENTS

| | | |
|---|---|---|
| 2003/0029163 A1 | 2/2003 | Tamura et al. |
| 2004/0006972 A1 | 1/2004 | Lewis et al. |
| 2004/0067177 A1 | 4/2004 | Thieman et al. |
| 2004/0182069 A1 | 9/2004 | Goralski, Jr. et al. |
| 2009/0317307 A1 | 12/2009 | Kanazawa |
| 2010/0318284 A1 * | 12/2010 | Surnilla et al. ............ 701/113 |

FOREIGN PATENT DOCUMENTS

| | | | |
|---|---|---|---|
| EP | 1 400 665 | 3/2004 | |
| JP | 09100716 A * | 4/1997 | ............ F01N 3/24 |
| JP | 10-128068 A | 5/1998 | |
| JP | 2002-201931 A | 7/2002 | |
| JP | 2007-160167 A | 6/2007 | |
| JP | 2007-160168 A | 6/2007 | |
| JP | 2007-162526 A | 6/2007 | |

* cited by examiner ly, and if running through this $NO_x$ adsorbent a gas which contains NO and
EXHAUST PURIFICATION DEVICE OF INTERNAL COMBUSTION ENGINE

CROSS REFERENCE TO RELATED APPLICATIONS

This application is a National Stage of International Application No. PCT/JP2010/062652 filed Jul. 21, 2010, the contents of all of which are incorporated herein by reference in their entirety.

TECHNICAL FIELD

The present invention relates to an exhaust purification device of an internal combustion engine.

BACKGROUND ART

It is already known that if using an $NO_x$ adsorbent in which a metal is carried on a carrier which is made of an oxide of at least one metal element selected from Co, Fe, Cu, Ce, and Mn, where the metal carried on the carrier is comprised of a metal which is selected from Cu, Co, Ag, and Pd and which is different from the metal contained in the carrier, and if running through this $NO_x$ adsorbent a gas which contains NO and CO, even at an ordinary temperature, the $NO_x$ adsorbent will adsorb the $NO_x$ (see Patent Literature 1).

CITATIONS LIST

Patent Literature

Patent Literature 1: Japanese Patent Publication No. 2007-160167 A1

SUMMARY OF INVENTION

Technical Problem

In this regard, the inventors have long been researching exhaust purification systems which use a catalyst which contains a carrier and carried metal which are similar to the carrier of this $NO_x$ adsorbent and the metal carried on this carrier and, when studying the exhaust purification action of the catalyst in the process of this research, it is confirmed that even with this catalyst, if the exhaust gas contains a certain extent or more of carbon monoxide CO, the $NO_x$ contained in the exhaust gas is adsorbed well at the catalyst from right after engine startup, that is, at ordinary temperature.

However, it has been proven that if using this catalyst to try to perform an $NO_x$ adsorption action, certain specific hydrocarbons which are contained in the exhaust gas inhibit the action of adsorption of $NO_x$ at the catalyst. These certain specific hydrocarbons are unsaturated hydrocarbons and high boiling point hydrocarbons which are liquid in a reference state (temperature 25° C., pressure 100 kPa). If the specific hydrocarbons are present in the exhaust gas in large amounts, the action of adsorption of $NO_x$ at the catalyst is inhibited. Therefore, to secure a good action of adsorption of $NO_x$ at the catalyst, the amount of the specific hydrocarbons in the exhaust gas has to be lowered. However, the above-mentioned Patent Literature 1 does not allude to this at all.

An object of the present invention is to provide an exhaust purification device of an internal combustion engine which is designed to be able to adsorb the $NO_x$ which is contained in exhaust gas well at a catalyst after engine startup and until the catalyst is activated.

Solution to Problem

According to the present invention, there is provided an exhaust purification system of internal combustion engine comprising an ordinary temperature $NO_x$ adsorption catalyst arranged in an engine exhaust passage, the ordinary temperature $NO_x$ adsorption catalyst being comprised of a carrier and a metal carried on the carrier and being able to adsorb $NO_x$ in a reference state, the carrier of the catalyst being comprised of an oxide of at least one metal element which is selected from Co, Fe, Cu, Ce, and Mn or a complex oxide which contains the metal element, the metal carried on the carrier being comprised of a metal which is selected from Cu, Co, Ag, Fe, Pt, Rh, and Pd and which is different from the metal contained in said carrier, the ordinary temperature $NO_x$ adsorption catalyst having a property of adsorbing $NO_x$ in the presence of carbon monoxide in the reference state and having a property in which an action of adsorption of $NO_x$ is inhibited by an action of deposition or adsorption of hydrocarbons at the catalyst when the hydrocarbons in the exhaust gas flowing into the catalyst are unsaturated hydrocarbons or high boiling point hydrocarbons which become liquid in the reference state, wherein, as a fuel, at least two types of fuel of a catalyst activation use fuel which is used after the ordinary temperature $NO_x$ adsorption catalyst is activated and a catalyst nonactivation use fuel which is used before the ordinary temperature $NO_x$ adsorption catalyst is activated and which has fewer the high boiling point hydrocarbons and unsaturated hydrocarbons compared with the catalyst activation use fuel are used, and the catalyst nonactivation use fuel is used as fuel and a concentration of carbon monoxide in the exhaust gas flowing into the catalyst is maintained at a concentration of more than the concentration which is required for adsorption of $NO_x$ until said ordinary temperature $NO_x$ adsorption catalyst is activated after engine startup.

Advantageous Effects of Invention

After engine startup and until the ordinary temperature $NO_x$ adsorption catalyst is activated, it is possible to secure a good $NO_x$ adsorption action at the ordinary temperature $NO_x$ adsorption catalyst.

DESCRIPTION OF EMBODIMENTS

Figure 1:
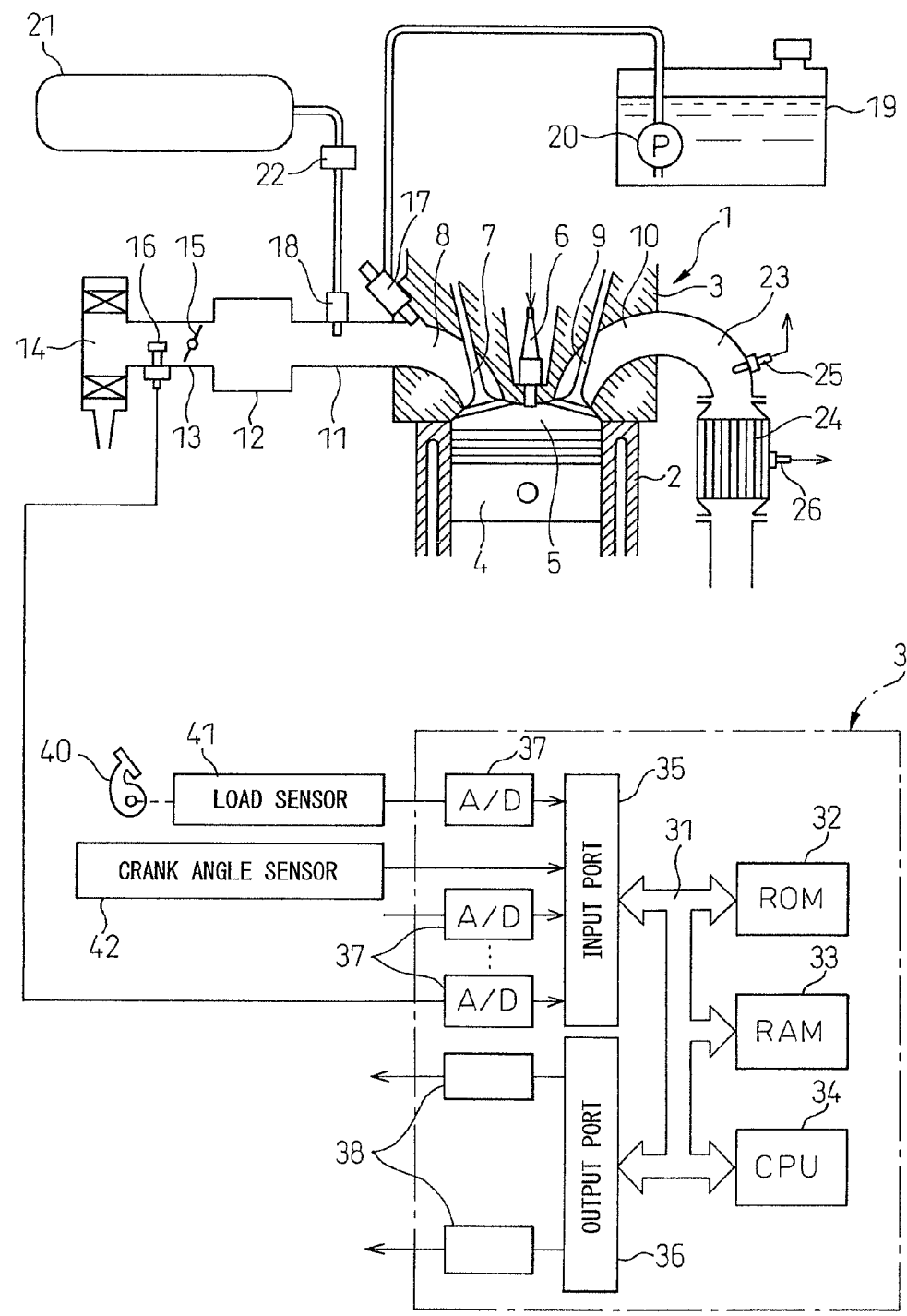
FIG. 1 is an overall view of an internal combustion engine.

FIG. 1 shows an overall view of an internal combustion engine.

Referring to FIG. 1, 1 indicates an internal combustion engine body, 2 a cylinder block, 3 a cylinder head, 4 a piston, 5 a combustion chamber, 6 a spark plug which is arranged at the center of the top of the combustion chamber 5, 7 an intake valve, 8 an intake port, 9 an exhaust valve, and 10 an exhaust port. Each intake port 8 is connected through an intake branch pipe 11 to a surge tank 12, while the surge tank 12 is connected through an intake duct 13 to an air cleaner 14. Inside the intake duct 13, a throttle valve 15 driven by the actuator and an intake air amount detector 16 are arranged.

In the embodiment shown in FIG. 1, as the fuel, two types of fuel of a first fuel and a second fuel are used. As shown in FIG. 1, in each intake port 8, a first fuel injector 17 for injecting the first fuel is arranged, while in each intake branch pipe 11, a second fuel injector 18 for injecting the second fuel is arranged. The first fuel which is stored in a fuel tank 19 is fed to the first fuel injector 17 by a feed pump 20, and this first fuel is injected from the first fuel injector 17. On the other hand, the second fuel which is stored in a fuel tank 21 is fed to the second fuel injector through a pressure regulator 22, and this second fuel is injected from the second fuel injector 18.

In the embodiment which is shown in FIG. 1, the first fuel is comprised of a plant-derived alcohol fuel or a mixed fuel of a plant-derived alcohol fuel and gasoline, while the second fuel is comprised of compressed natural gas (CNG). Therefore, in the embodiment which is shown in FIG. 1, a plant-derived alcohol fuel or a mixed fuel of a plant-derived alcohol fuel and gasoline is injected from the first fuel injector 17, while compressed natural gas is injected from the second fuel injector 18.

On the other hand, as shown in FIG. 1, each exhaust port 10 is connected through an exhaust manifold 23 to a catalyst 24.

In the embodiment shown in FIG. 1, this catalyst 24 performs the role of an $NO_x$ adsorption catalyst which can absorb the $NO_x$ contained in the exhaust gas before the catalyst 24 is activated and performs the role of a three-way catalyst which can simultaneously reduce the HC, CO, and $NO_x$ in the exhaust gas under a stoichiometric air-fuel ratio when the catalyst 24 is activated. An air-fuel ratio sensor 25 for detecting the air-fuel ratio of the exhaust gas is attached to the exhaust manifold 23, while a temperature sensor 26 for judging if the catalyst 24 is activated is attached to the catalyst 24.

The electronic control unit 30 is comprised of a digital computer which is provided with a ROM (read only memory) 32, RAM (random access memory) 33, CPU (microprocessor) 34, input port 35, and output port 36, which are connected to each other by a bidirectional bus 31. An output signal of the intake air amount detector 16, an output signal of the air-fuel ratio sensor 23, and an output signal of the temperature sensor 26 are input through respectively corresponding AD converters 37 to an input port 35. Further, an accelerator pedal 40 has a load sensor 41 connected to it which generates an output voltage which is proportional to the amount of depression of the accelerator pedal 40. The output voltage of the load sensor 41 is input through a corresponding AD converter 37 to the input port 35. Further, the input port 35 has connected to it a crank angle sensor 42 which generates an output pulse each time the crankshaft for example rotates by 30°. On the other hand, the output port 36 is connected through corresponding drive circuits 38 to each spark plug 6, actuator for driving the throttle valve 15, first fuel injector 17, second fuel injector 18, and feed pump 20.

Now then, the catalyst 24 shown in FIG. 1 is comprised of a carrier and a metal which is carried on the carrier. In this catalyst 24, the carrier of the catalyst is comprised of an oxide of at least one metal element which is selected from Co, Fe, Cu, Ce, and Mn or a complex oxide which contains such a metal element, and the metal carried on the carrier is a metal which is selected from Cu, Co, Ag, Fe, Pt, Rh, and Pd and which is different from the metal contained in the carrier.

Figure 2:
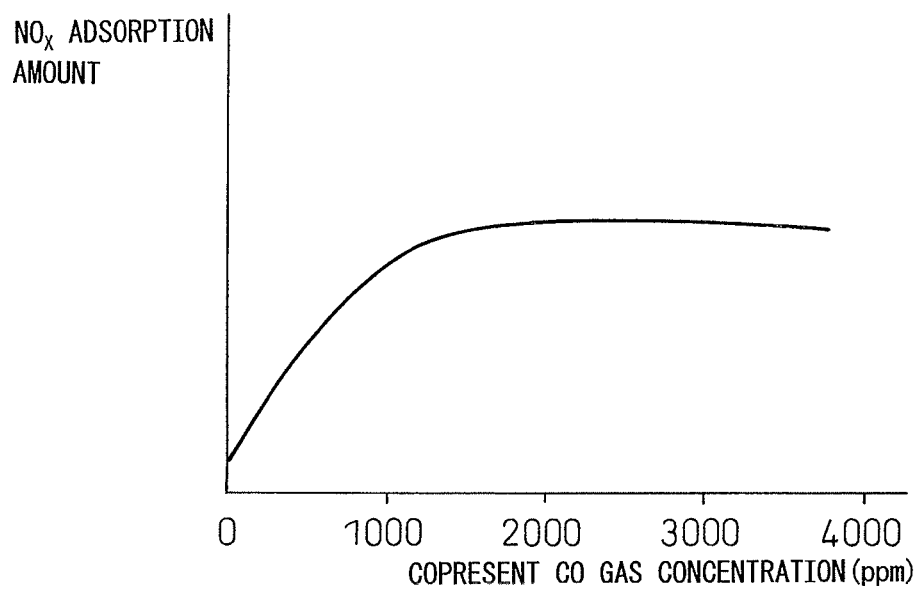
FIG. 2 is a view which shows the relationship between a copresent CO gas concentration and amount of adsorption of $NO_x$.

As the catalyst 24, for example, a catalyst which is comprised of a carrier made of ceria $CeO_2$ on which 5 wt % of palladium Pd is carried is used. FIG. 2 shows the results of experiments on the amount of adsorption of $NO_x$ when a model gas is made to run over this catalyst in a reference state (temperature 25° C., pressure 100 kPa). As this model gas, $N_2$ gas which contains NO and CO is used. Experiments were run for the cases of changing the CO gas concentration (ppm) in various ways with respect to 1000 ppm of NO.

As will be understood from FIG. 2, when the copresent CO gas concentration is lower than the NO concentration, the $NO_x$ adsorption amount increases as the CO gas concentration becomes higher. If the CO gas concentration becomes slightly higher than the NO concentration, even if the CO gas concentration becomes higher somewhat above that, the $NO_x$ adsorption amount no longer increases. Therefore, this catalyst 24 has the property of adsorbing $NO_x$ in the reference state in the presence of carbon monoxide CO. Therefore, hereinafter, this catalyst 24 will be called the "ordinary temperature $NO_x$ adsorption catalyst" which can adsorb $NO_x$ in the reference state. Such an action of adsorption of $NO_x$ at the catalyst 24 similarly occurs even when using as the carrier of the catalyst an oxide of a metal element other than cesium Ce such as Co, Fe, Cu, or Mn or a complex oxide which contains these metal elements and using as the carried metal on the carrier a metal other than palladium Pd such as Cu, Co, Ag, Fe, Pt, or Rh.

Figure 3:
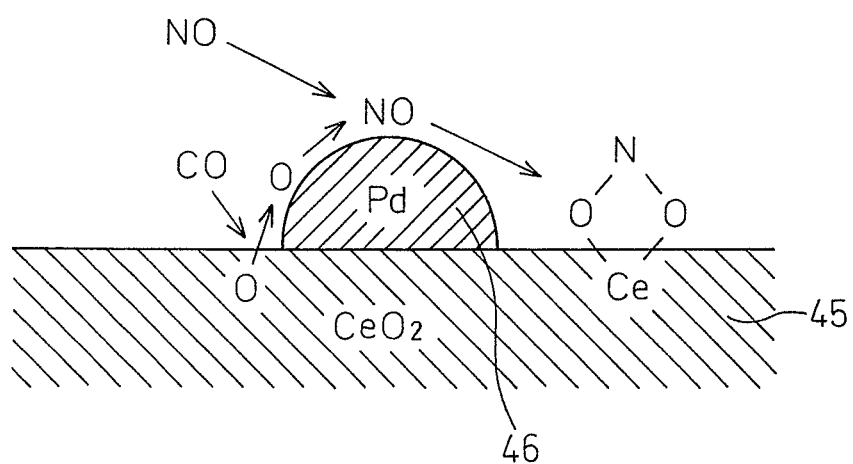
FIG. 3 is a view which schematically shows the surface of the carrier of an ordinary temperature $NO_x$ adsorption catalyst.

FIG. 3 schematically shows the surface of the carrier 45 which is made of ceria $CeO_2$. Further, FIG. 3 shows the $NO_x$ adsorption mechanism which is believed to occur when the air-fuel ratio of the exhaust gas is made the stoichiometric air-fuel ratio, somewhat rich, or somewhat lean. According to this $NO_x$ adsorption mechanism, the CO which is contained in the exhaust gas pulls out the O of the ceria $CeO_2$ and is adsorbed on the carrier 45. On the other hand, the NO which is contained in the exhaust gas reacts with the O which is pulled out from the ceria $CeO_2$ on the carrier metal 46 made of palladium Pd to become $NO_2$. This $NO_2$ is chemically adsorbed at the cerium Ce. In this way, the $NO_x$ is adsorbed on the carrier 45.

CO is strong in ability to attract O, that is, in reducing ability. It is confirmed that CO pulls out the O of ceria $CeO_2$ and is adsorbed. Further, it is also confirmed that $NO_2$ is chemically adsorbed at the cerium Ce. As opposed to this, it can be considered that NO reacts with the O which is pulled out from the ceria $CeO_2$, but this remains the realm of speculation. Whatever the case, it is certain that CO and $NO_x$ are co-adsorbed and thereby $NO_x$ is adsorbed.

$NO_x$ is not adsorbed in the form of NO. To make NO be adsorbed, it is necessary to make the NO oxidize to make it $NO_2$. In this case, in the past, it had been thought that if the exhaust gas contained CO, this CO would cause the carried metal 46 to be poisoned and as a result the formation of $NO_2$ would be inhibited, so the $NO_x$ adsorption action would be inhibited. However, with the method which is used in the present invention, the adsorption of $NO_x$ requires the presence of CO. Therefore, the method of adsorption of $NO_x$ which is used in the present invention can be said to be a method which overturns what was thought common knowledge in the past.

Further, in the $NO_x$ adsorption method which is used the present invention, as explained above, $NO_2$ is chemically adsorbed at the cerium Ce. If chemically adsorbed in this way, the holding force on the $NO_2$ becomes stronger and the adsorbed $NO_2$ is desorbed when the temperature of the catalyst 24 rises to 300° C. or more. If the temperature of the catalyst 24 rises to 300° C. or more, the catalyst 24 is activated. Therefore, in the $NO_x$ adsorption method which is used the present invention, when the catalyst 24 is activated, $NO_2$ is desorbed. If $NO_2$ is desorbed when the catalyst 24 is activated, this desorbed $NO_2$ is removed at the catalyst 24, therefore, $NO_x$ is not exhausted into the atmosphere at all.

Figure 4:
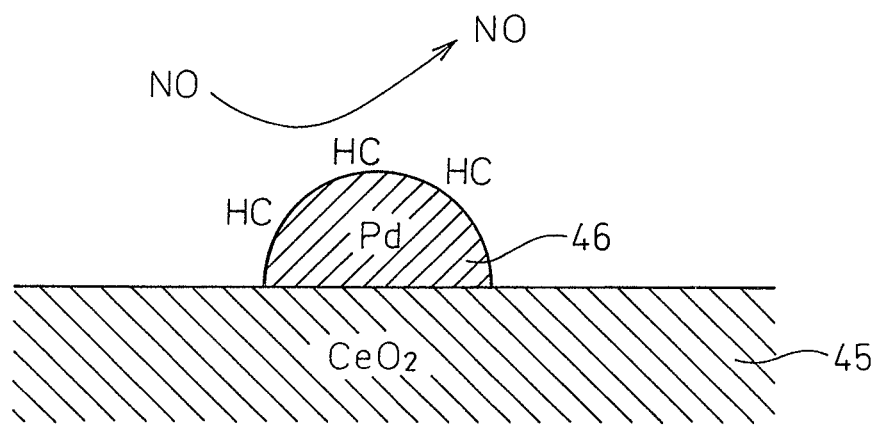
FIG. 4 is a view which schematically shows the surface of the carrier of an ordinary temperature $NO_x$ adsorption catalyst.

Now then, the ordinary temperature $NO_x$ adsorption catalyst 24 according to the present invention, as explained up to here, can adsorb the $NO_x$ which is contained in the exhaust gas well in the reference state even in the presence of CO. However, when studying the exhaust purification action of this ordinary temperature $NO_x$ adsorption catalyst 24, it was learned that this ordinary temperature $NO_x$ adsorption catalyst 24 is not poisoned by CO, but is poisoned by specific hydrocarbons HC. That is, as shown in FIG. 4, if the surface of the carried metal 46 is covered by hydrocarbons HC, the NO which is contained in the exhaust gas has trouble being converted to $NO_2$ and therefore the action of adsorption of $NO_x$ is inhibited.

In this regard, the surface of the carried metal 46 is gradually covered by deposition or adsorption of hydrocarbons HC, but in this case, the degree by which the surface of the carried metal 46 is covered by the hydrocarbons HC differs considerably depending on the type of the hydrocarbons HC. This will be explained while referring to FIG. 5.

Figure 5:
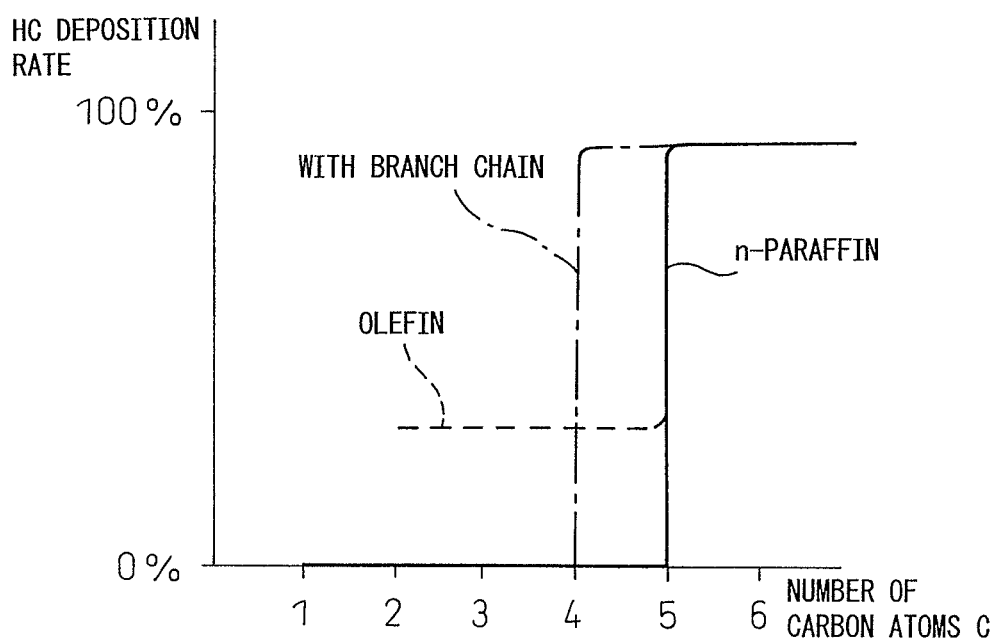
FIG. 5 is a view which shows the relationship between the number of carbon atoms C of hydrocarbons and the HC deposition rate.

In FIG. 5, the HC deposition rate of the ordinate indicates the rate by which hydrocarbons HC deposit or are adsorbed on the surface of the carried metal 46 in the reference state, while the abscissa shows the number of carbon atoms C of the hydrocarbons HC. Now then, in FIG. 5, the solid line shows the changes in the HC deposition rate when using n-paraffin as fuel and increasing the number of carbon atoms C of the n-paraffin. As will be understood from the solid line, n-paraffin is a gas in the reference state up to four carbon atoms C and, in this case, the n-paraffin does not deposit on the surface of the carried metal 46, so the HC deposition rate becomes 0%. As opposed to this, n-paraffin becomes a liquid in the reference state if the number of carbon atoms C becomes five or more. At this time, n-paraffin more easily deposits on the surface of the carried metal 46, so the HC deposition rate increases.

On the other hand, if the hydrocarbons HC have branched chains, even if the number of carbon atoms C is 4, the hydrocarbons HC becomes liquid in the reference state. Accordingly, as shown in FIG. 5 by the dot and dash line, when the hydrocarbons HC have branched chains, if the number of carbon atoms C is 4, the HC deposition rate becomes higher. In this way, hydrocarbons which become liquid in the reference state are referred to in the Description of the present application as "high boiling point hydrocarbons".

On the other hand, even if an olefin were a gas in the reference state, the active chemical adsorption action of the double bond parts make deposition on the surface of the carried metal 46 easier. Therefore, as shown in FIG. 5 by the broken line, when the hydrocarbons are an olefin, that is, unsaturated hydrocarbons, the HC deposition rate becomes higher. Note that, if the number of carbon atoms C of the olefin becomes the number of carbon atoms resulting in a liquid state in the reference state, as shown by the solid line or dot and dash line, the HC deposition rate becomes further higher.

Figure 6:
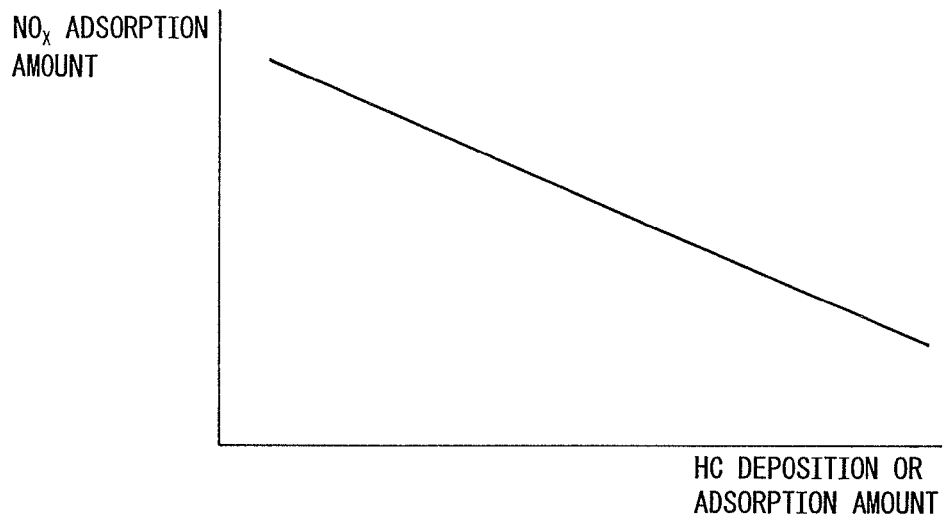
FIG. 6 is a view which shows the relationship between the amount of deposition or adsorption of HC and the amount of adsorption of $NO_x$.

In this way, the ordinary temperature $NO_x$ adsorption catalyst 24 according to the present invention has the property of depositing or adsorbing hydrocarbons on the catalyst 24 and has the property in which, when the hydrocarbons in the exhaust gas which flows to the catalyst 24 are unsaturated hydrocarbons or high boiling point hydrocarbons which become liquid in the reference state, these hydrocarbons deposit or are adsorbed on the catalyst 24, and an action of adsorption of $NO_x$ is inhibited by an action of deposition or adsorption of hydrocarbons at the catalyst 24. In this case, the amount of adsorption of $NO_x$, as shown in FIG. 6, is decreased the more the amount of HC deposition or adsorption at the ordinary temperature $NO_x$ adsorption catalyst 24 is increased.

If the ordinary temperature $NO_x$ adsorption catalyst 24 is activated, the $NO_2$ which is deposited or adsorbed at the catalyst 24 is made to desorb, and this desorbed $NO_2$ and $NO_x$ contained in the exhaust gas are made to be reduced at the catalyst 24. Therefore, after the catalyst 24 is activated, $NO_x$ will never be exhausted into the atmosphere. As opposed to this, before the catalyst 24 is activated, $NO_x$ cannot be reduced. Therefore, at this time, to keep the $NO_x$ from being exhausted into the atmosphere, it is necessary to make the $NO_x$ which is contained in the exhaust gas be deposited or adsorbed at the catalyst 24 as much as possible.

Therefore, in the present invention, to make the $NO_x$ deposit or be adsorbed at the catalyst 24 as much as possible until the catalyst 24 is activated, the amount of high boiling point hydrocarbons or the amount of unsaturated hydrocarbons, which are contained in the exhaust gas flowing into the catalyst 24, is made to lower while maintaining a concentration of carbon monoxide, that is, CO concentration, in the exhaust gas flowing into the catalyst 24 at a concentration of more than the concentration which is required for adsorption of $NO_x$ until the ordinary temperature $NO_x$ adsorption catalyst is activated after engine startup.

Here, the CO concentration which is required for adsorption of $NO_x$, as explained above, is substantially equal to the $NO_x$ concentration which is contained in the exhaust gas. Therefore, in the present invention, after engine startup and until the ordinary temperature NO adsorption catalyst 24 is activated, the CO concentration in the exhaust gas which flows into the catalyst 24 is made higher than the $NO_x$ concentration in the exhaust gas. Usually, in an internal combustion engine, after engine startup and until the ordinary temperature $NO_x$ adsorption catalyst 24 is activated, the CO concentration in the exhaust gas becomes higher than the $NO_x$ concentration. However, depending on the internal combustion engine, sometimes, after engine startup and until the ordinary temperature NO adsorption catalyst 24 is activated, the CO concentration in the exhaust gas becomes lower than the NO concentration. In this case, by making the air-fuel ratio smaller or by retarding the ignition timing, the CO concentration in the exhaust gas is made higher than the $NO_x$ concentration.

On the other hand, in the present invention, as explained above, after engine startup and until the ordinary temperature NO adsorption catalyst 24 is activated, the amount of high boiling point hydrocarbons or the amount of unsaturated hydrocarbons, which are contained in the exhaust gas which flows into the catalyst 24, is lowered. In this case, in the first embodiment according to the present invention, before the catalyst 24 is activated, compared with after the catalyst 24 is activated, fuel with less high boiling point hydrocarbons and unsaturated hydrocarbons is used. Due to this, after engine startup and until the ordinary temperature $NO_x$ adsorption catalyst 24 is activated, the amounts of high boiling point hydrocarbons and unsaturated hydrocarbons which are contained in the exhaust gas which flows into the catalyst 24 is lowered.

Explained in another way, in the first embodiment according to the present invention, as the fuel, at least two types of fuel, that is, the catalyst activation use fuel which is used after the ordinary temperature NOX adsorption catalyst 24 is activated and the catalyst nonactivation use fuel which is used before the ordinary temperature $NO_x$ adsorption catalyst 24 is activated and which has fewer high boiling point hydrocarbons and unsaturated hydrocarbons compared with the catalyst activation use fuel, are used. After engine startup and until the ordinary temperature $NO_x$ adsorption catalyst 24 is activated, the catalyst nonactivation use fuel is used as the fuel.

In this regard, when the catalyst 24 is in an unactivated state, to make the $NO_x$ be adsorbed at the catalyst 24 as much as possible, at the time of nonactivation of the catalyst, it is preferable to use as the fuel a fuel which as little an amount of high boiling point hydrocarbons and unsaturated hydrocarbons as possible. Therefore, in the first embodiment according to the present invention, as the catalyst nonactivation use fuel, compressed natural gas which has methane as its main ingredient is used.

Figure 7:
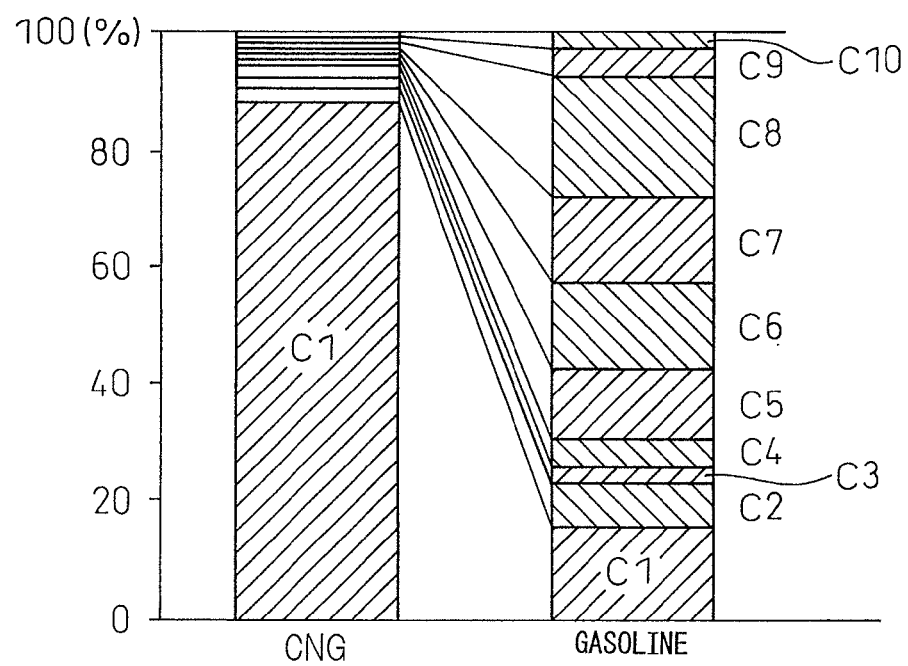
FIG. 7 is a view which shows a comparison of the ingredients of compressed natural gas (CNG) and gasoline.

FIG. 7 shows the ingredients of this compressed natural gas (CNG) in a form compared with the ingredients of gasoline. Note that, in FIG. 7, C1, C2, . . . respectively indicate a hydrocarbon with one carbon atom C, a hydrocarbon with two carbon atoms C . . . . As will be understood from FIG. 7, compressed natural gas is comprised close to 90% by a hydrocarbon with one carbon atom C, that is, methane. In addition to this methane, if including hydrocarbons with two and three carbon atoms C, that is, ethane and propane, the figure becomes 90% or more. On the other hand, from FIG. 5, it will be understood that if using a hydrocarbon with one, two, or three carbon atoms C, that is, methane, ethane, or propane, as the fuel, the HC deposition rate becomes 0. That is, if using compressed natural gas as the fuel, the HC deposition rate becomes extremely low and therefore almost all of the $NO_x$ which is contained in the exhaust gas becomes adsorbed at the catalyst 24.

In fact, it is confirmed by experiments that after engine startup and until the ordinary temperature $NO_x$ adsorption catalyst 24 is activated, if using compressed natural gas as fuel and maintaining the air-fuel ratio at the stoichiometric air-fuel ratio or somewhat rich or somewhat lean, the exhaust gas which flows out from the ordinary temperature $NO_x$ adsorption catalyst 24 does not contain almost any $NO_x$.

Needless to say, this compressed natural gas can be used as fuel even after the ordinary temperature $NO_x$ adsorption catalyst 24 is activated. However, this compressed natural gas requires a large volume for storage of the same amount of fuel compared with liquid fuel. Therefore, in the first embodiment according to the present invention, until the catalyst 24 is activated, as the fuel, compressed natural gas is used, while after the catalyst 24 is activated, as the fuel, liquid fuel is used. Due to this, the storage volume for the fuel is made smaller.

Incidentally, in the embodiment which is shown in FIG. 1, after engine startup and until the ordinary temperature $NO_x$ adsorption catalyst 24 is activated, the compressed natural gas stored in the fuel tank 21 is injected from the second fuel injector 18, while after the catalyst 24 is activated, the plant-derived alcohol fuel or other liquid fuel which is stored in the fuel tank 19 is injected from the first fuel injector 17. Note that, in this embodiment, after engine startup and until the ordinary temperature $NO_x$ adsorption catalyst 24 is activated, the air-fuel ratio is controlled to the stoichiometric air-fuel ratio or somewhat rich, while after the ordinary temperature NOX adsorption catalyst 24 is activated, the air-fuel ratio is controlled to the stoichiometric air-fuel ratio.

Figure 8:
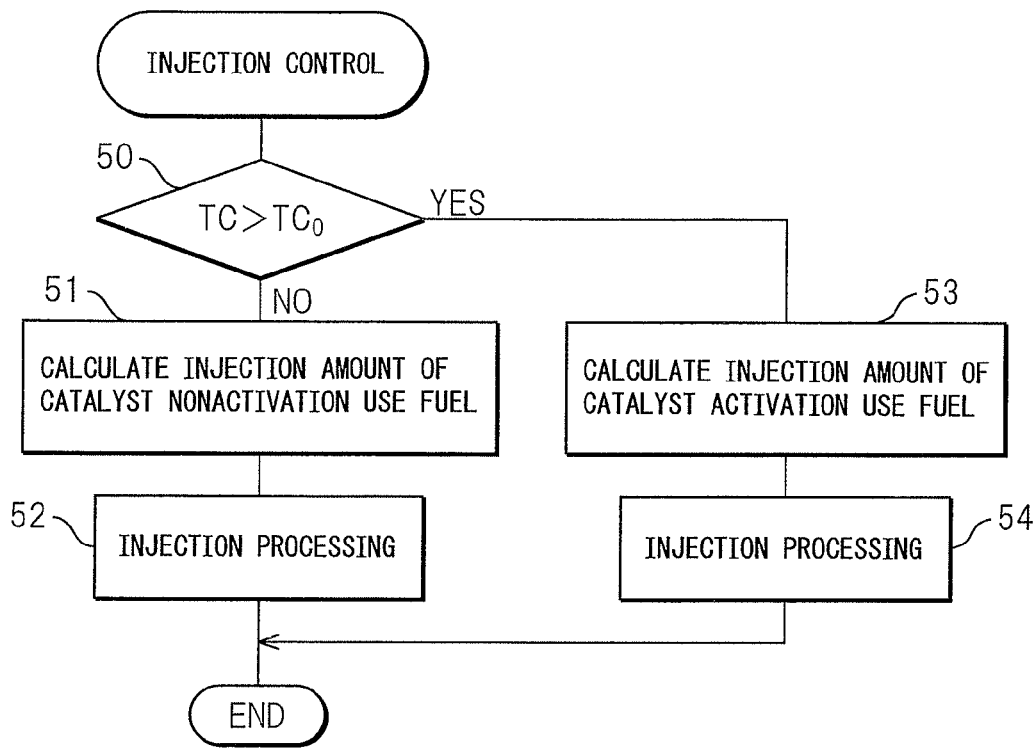
FIG. 8 is a flow chart for performing injection control of fuel.

FIG. 8 shows the injection control routine which is executed in the embodiment which is shown in FIG. 1.

Referring to FIG. 8, first, at step 50, it is judged based on the output signal of the temperature sensor 26 whether or not the temperature TC of the ordinary temperature $NO_x$ adsorption catalyst 24 exceeds the activation temperature $TC_0$. When $TC \leq TC_0$, that is, when the catalyst 24 is not activated, the routine proceeds to step 51 where the amount of injection of the catalyst nonactivation use fuel, that is, compressed natural gas, is calculated. Next, at step 52, the compressed natural gas is injected from the second fuel injector 18. At this time, the air-fuel ratio is controlled based on the output signal of the air-fuel ratio sensor 25 to the stoichiometric air-fuel ratio or somewhat rich.

As opposed to this, when it is judged at step 50 that $TC > TC_0$, that is, when it is judged that the catalyst 24 is activated, the routine proceeds to step 53 where the amount of injection of the catalyst activation use fuel, that is, plant-derived alcohol fuel etc., is calculated. Next, at step 54, the plant-derived alcohol fuel etc. is injected from the first fuel injector 17. At this time, the air-fuel ratio is controlled based on the output signal of the air-fuel ratio sensor 25 to the stoichiometric air-fuel ratio.

Figure 9:
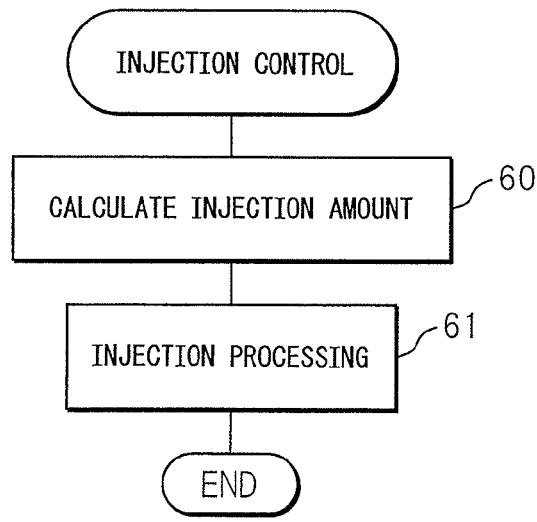
FIG. 9 is a flow chart for performing injection control of fuel.

FIG. 9 shows the injection control routine in the case where the compressed natural gas is used as the fuel irrespective of whether before activation of the catalyst 24 or after activation. In this case, in FIG. 1, the first fuel injector 17 does not have to be provided.

Referring to FIG. 9, first, at step 60, the amount of injection of compressed natural gas is calculated. Next, at step 61, the compressed natural gas is injected from the second fuel injector 18. Note that, in this case as well, before the catalyst 24 is activated, the air-fuel ratio is controlled to the stoichiometric air-fuel ratio or somewhat rich, while after the catalyst 24 is activated, the air-fuel ratio is controlled to the stoichiometric air-fuel ratio.

Figure 10:
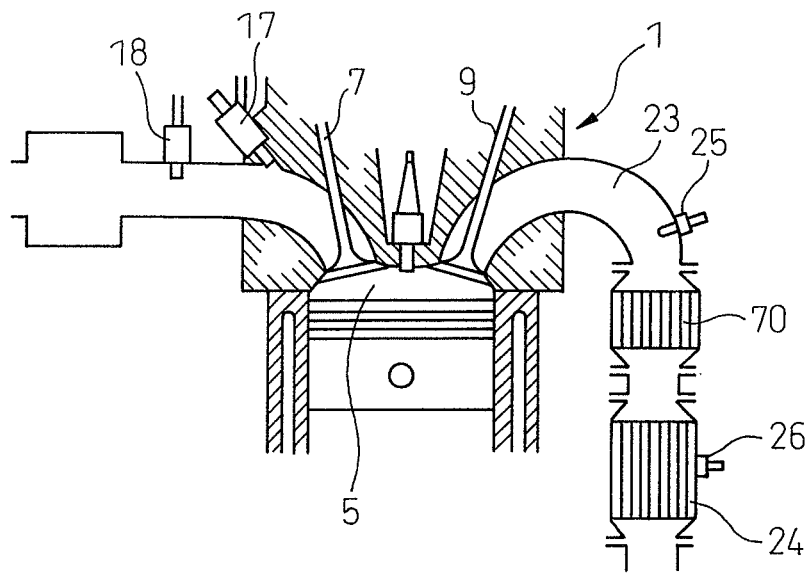
FIG. 10 is an overall view which shows another embodiment of an internal combustion engine.

FIG. 10 shows another embodiment. In this embodiment, as shown in FIG. 10, an HC adsorbent 70 which adsorbs high boiling point hydrocarbons and unsaturated hydrocarbons is arranged in the engine exhaust passage upstream of the ordinary temperature $NO_x$ adsorption catalyst 24. As this HC adsorbent 70, an HC adsorbent which has the property of adsorbing high boiling point hydrocarbons and unsaturated hydrocarbons which are contained in exhaust gas after engine startup and until the ordinary temperature $NO_x$ adsorption catalyst 24 is activated and releasing the adsorbed high boiling point hydrocarbons and unsaturated hydrocarbons after the ordinary temperature NOX adsorption catalyst 24 is activated is used.

Therefore, in this embodiment, even if the exhaust gas contains high boiling point hydrocarbons and unsaturated hydrocarbons, after engine startup and until the ordinary temperature $NO_x$ adsorption catalyst 24 is activated, these high boiling point hydrocarbons and unsaturated hydrocarbons are adsorbed at the HC adsorbent 70. Therefore, after engine startup and until the ordinary temperature $NO_x$ adsorption catalyst 24 is activated, the high boiling point hydrocarbons and unsaturated hydrocarbons which are contained in the exhaust gas are kept from flowing into the ordinary temperature $NO_x$ adsorption catalyst 24 and therefore a good action of adsorption of $NO_x$ at the catalyst 24 is secured.

Further, instead of an HC adsorbent 70, it is possible to use an HC adsorption catalyst which has the property of adsorbing high boiling point hydrocarbons and unsaturated hydrocarbons which are contained in exhaust gas after engine startup and until the ordinary temperature $NO_x$ adsorption catalyst 24 is activated and releasing the adsorbed high boiling point hydrocarbons and unsaturated hydrocarbons after the ordinary temperature $NO_x$ adsorption catalyst 24 is activated.

Therefore, in this case as well, after engine startup and until the ordinary temperature $NO_x$ adsorption catalyst 24 is activated, the high boiling point hydrocarbons and unsaturated hydrocarbons which are contained in the exhaust gas are adsorbed at the HC adsorption catalyst 70 and therefore a good action of adsorption of $NO_x$ at the ordinary temperature $NO_x$ adsorption catalyst 24 is secured.

As this HC adsorption catalyst 70, it is possible to use the same catalyst as the ordinary temperature $NO_x$ adsorption catalyst 24. In this case, the additional adsorption catalyst 70 is arranged in the engine exhaust passage in addition to the adsorption catalyst 24. Further, when using as the HC adsorption catalyst 70 a catalyst the same as the ordinary temperature $NO_x$ adsorption catalyst 24, as shown in FIG. 11, the additional adsorption catalyst 70 and the ordinary temperature $NO_x$ adsorption catalyst 24 can be formed integrally.

Figure 11:
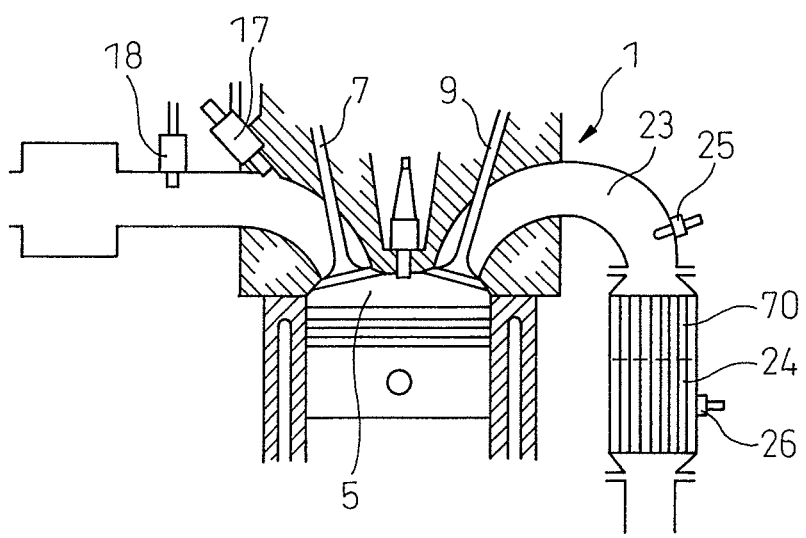
FIG. 11 is an overall view which shows still another embodiment of an internal combustion engine.

In the embodiment which is shown in FIG. 10 and FIG. 11, even if the high boiling point hydrocarbons and unsaturated hydrocarbons are contained in the exhaust gas, these high boiling point hydrocarbons and unsaturated hydrocarbons are adsorbed at the HC adsorbent or the additional adsorption catalyst 70. Therefore, in the embodiment shown in FIG. 10 and FIG. 11, after engine startup and until the ordinary temperature $NO_x$ adsorption catalyst 24 is activated, as the fuel, in addition to compressed natural gas which does not contain almost any high boiling point hydrocarbons and unsaturated hydrocarbons, a fuel which contains large amounts of high boiling point hydrocarbons and unsaturated hydrocarbons, for example, a plant-derived alcohol fuel, gasoline, or a mixed fuel of a plant-derived alcohol fuel and gasoline can be used.

That is, in the embodiment shown in FIG. 10 and FIG. 11, as the fuel, it is possible to use at least two types of fuel of the catalyst activation use fuel which is used after the ordinary temperature NOX adsorption catalyst 24 is activated and the catalyst nonactivation use fuel which is used until the ordinary temperature $NO_x$ adsorption catalyst 24 is activated after engine startup and which has less high boiling point hydrocarbons and unsaturated hydrocarbons compared with the catalyst activation use fuel, it is possible to use, as the fuel, only compressed natural gas which has methane as its main ingredient, or it is possible to use, as the fuel, only a fuel which has more high boiling point hydrocarbons and unsaturated hydrocarbons compared with compressed natural gas.

FIG. 12 to FIG. 22 show various embodiments which are able to use various fuels in this way.

Figure 12:
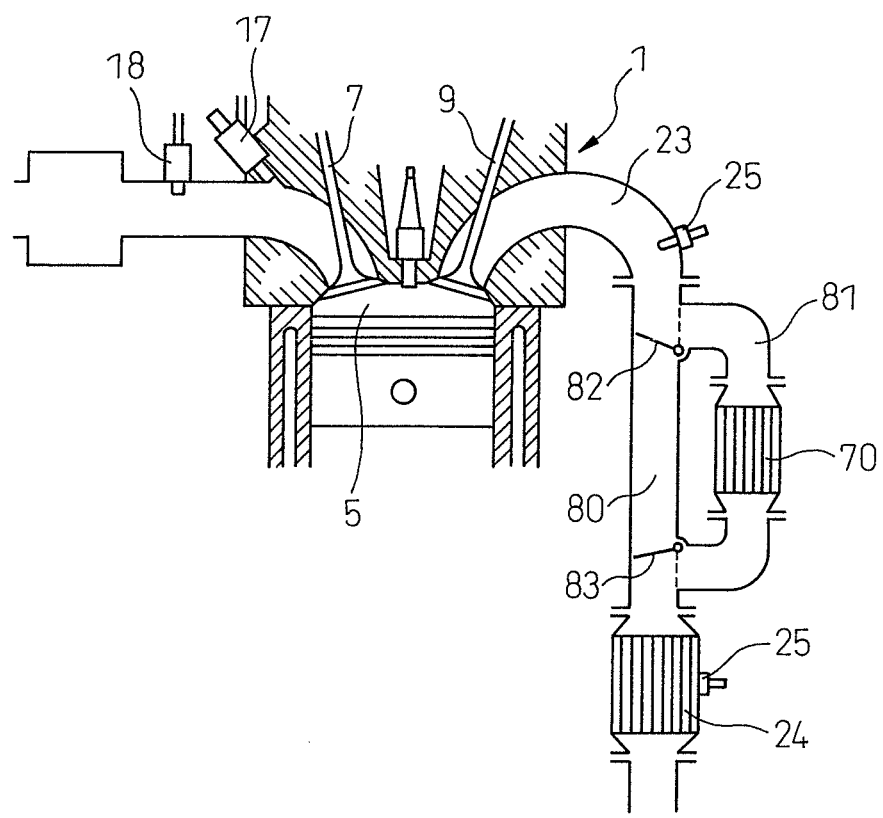
FIG. 12 is an overall view which shows still another embodiment of an internal combustion engine.

Referring to FIG. 12, in this embodiment, a bypass passage 81 is provided with respect to a main exhaust passage 80 which connects an outlet of the exhaust manifold 23 and an inlet of the ordinary temperature $NO_x$ adsorption catalyst 24, and flow switching valves 82 and 83 are arranged respectively at the inlet part and outlet part of the bypass passage 81. That is, in this embodiment, the bypass passage 81 is juxtaposed to the engine exhaust passage upstream of the ordinary temperature $NO_x$ adsorption catalyst 24. Further, in this embodiment, an adsorbent which adsorbs the high boiling point hydrocarbons and unsaturated hydrocarbons or the additional adsorbent 70 is arranged in bypass passage 81.

In this embodiment, after engine startup and until the ordinary temperature $NO_x$ adsorption catalyst 24 is activated, as shown in FIG. 12 by the solid lines, the flow control valve 82 opens the inlet part of the bypass passage 81 while the flow control valve 83 opens the outlet part of the bypass passage 81. Due to this, the exhaust gas exhausted from the engine passes through the bypass passage 81 and is fed to the ordinary temperature $NO_x$ adsorption catalyst 24. At this time, the high boiling point hydrocarbons and unsaturated hydrocarbons which are contained in the exhaust gas are adsorbed by the adsorbent or adsorption catalyst 70. Next, when the ordinary temperature $NO_x$ adsorption catalyst 24 is activated, the adsorbed high boiling point hydrocarbons and unsaturated hydrocarbons are made to desorb from the adsorbent or adsorption catalyst 70.

On the other hand, if the ordinary temperature $NO_x$ adsorption catalyst is activated, after that, as shown in FIG. 12 by the broken lines, the flow switching valve 82 closes the inlet part of the bypass passage 81 and the flow switching valve 83 closes the outlet part of the bypass passage 81. As a result, the exhaust gas which is exhausted from the engine is fed to the ordinary temperature $NO_x$ adsorption catalyst 24 without routing the bypass passage 81.

Figure 13:
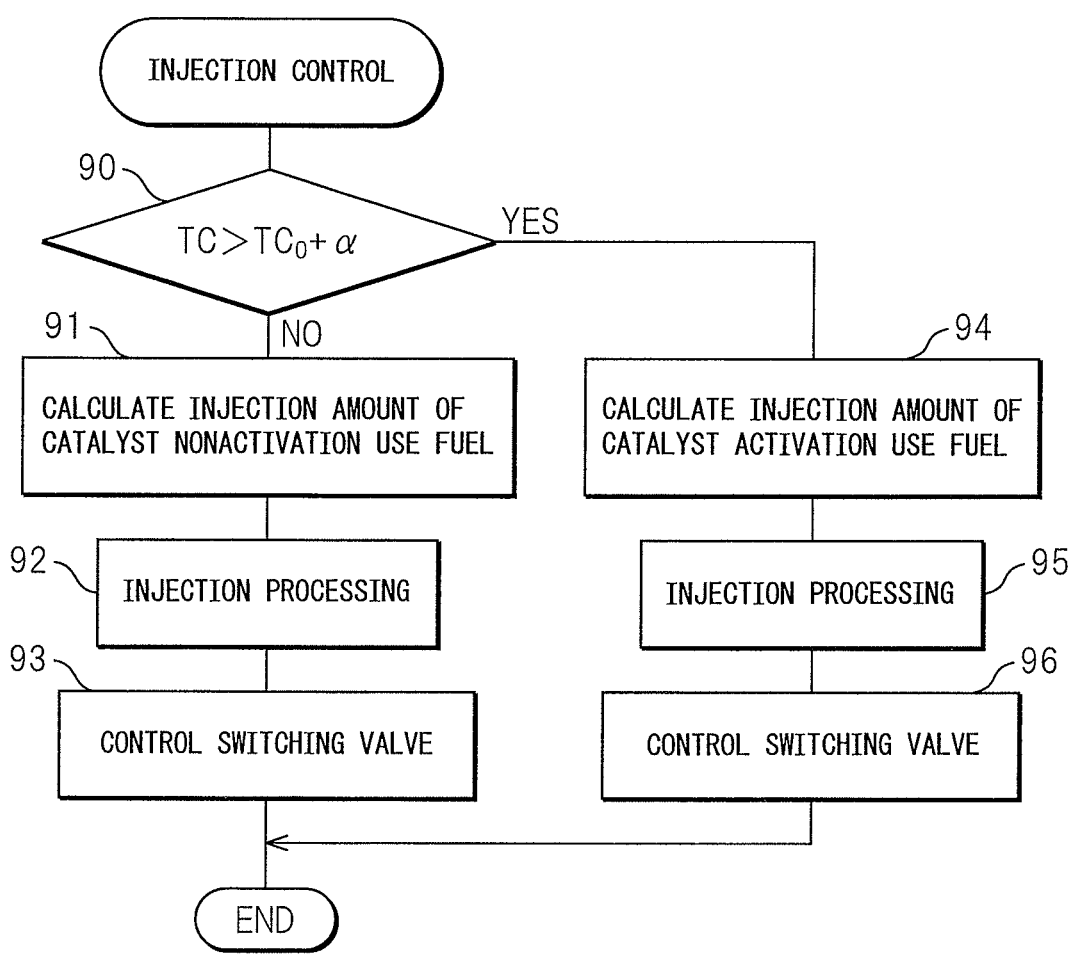
FIG. 13 is a flow chart for performing injection control of fuel.

FIG. 13 shows an injection control routine for the embodiment which is shown in FIG. 12.

Referring to FIG. 13, first, at step 90, it is judged based on the output signal of the temperature sensor 26 whether or not the temperature TC of the ordinary temperature $NO_x$ adsorption catalyst 24 exceeds the activation temperature $TC_0$+constant temperature $\alpha$. When $TC \leq TC_0 + \alpha$, the routine proceeds to step 91 where the amount of injection of the catalyst nonactivation use fuel, that is, for example, compressed natural gas, is calculated. Next, at step 92, for example, compressed natural gas is injected from the second fuel injector 18. At this time, the air-fuel ratio is controlled based on the output signal of the air-fuel ratio sensor 25 to the stoichiometric air-fuel ratio or somewhat rich. Next, at step 93, the flow switching valves 82 and 83 are held at the positions which are shown by the solid lines in FIG. 12.

As opposed to this, when it is judged at step 90 that $TC>TC_0+\alpha$, the routine proceeds to step 94 where the amount of injection of the catalyst activation use fuel, for example, the plant-derived alcohol fuel, is calculated. Next, at step 95, for example, the plant-derived alcohol fuel is injected from the first fuel injector 17. At this time, the air-fuel ratio is controlled based on the output signal of the air-fuel ratio sensor 25 to the stoichiometric air-fuel ratio. Next, at step 96, the flow switching valves 82 and 83 are held at the positions which are shown by the broken lines in FIG. 12

Figure 14:
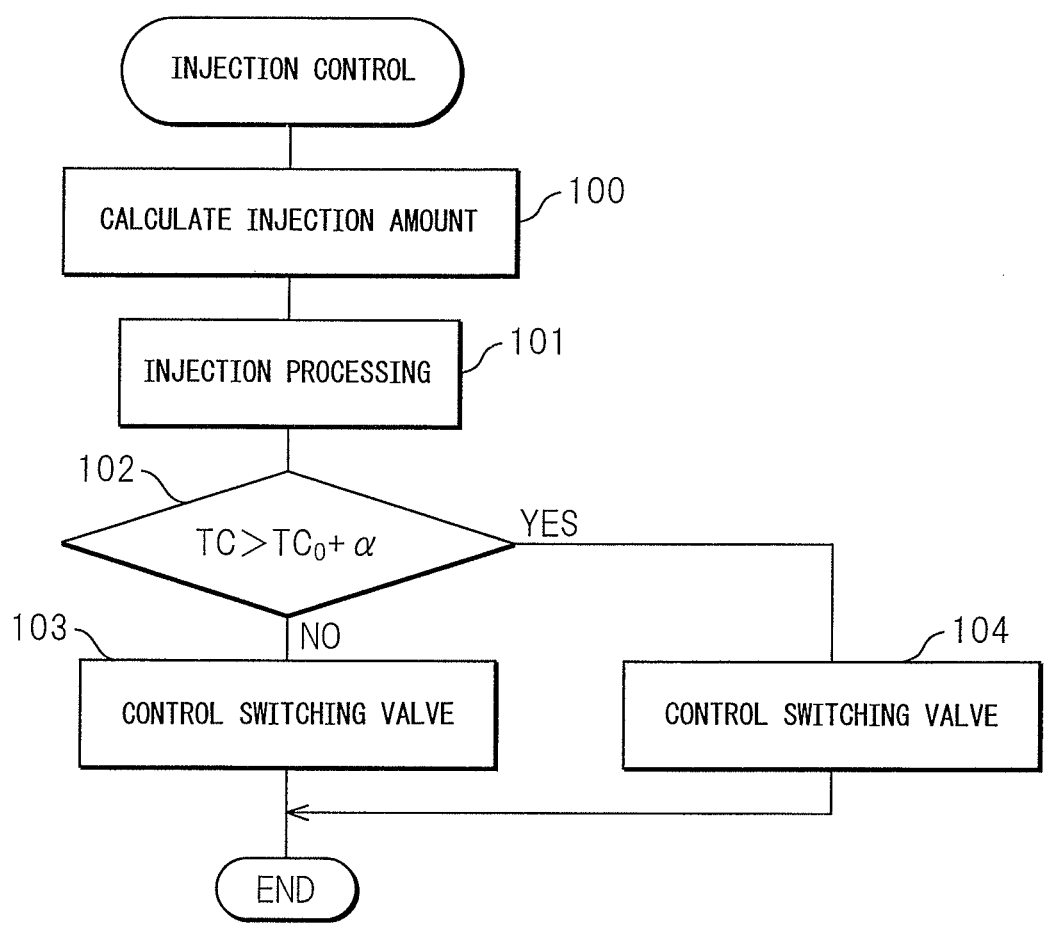
FIG. 14 is a flow chart for performing injection control of fuel.

FIG. 14 shows the injection control routine in the case where only compressed natural gas, only a plant-derived alcohol fuel, only gasoline, or only a mixed fuel of a plant-derived alcohol and gasoline is used as the fuel irrespective of whether before activation of the catalyst 24 or after activation thereof.

Referring to FIG. 14, first, at step 100, the amount of injection of fuel is calculated. Next, at step 101, fuel injection processing is performed. Next, at step 102, it is judged based on the output signal of the temperature sensor 26 whether or not the temperature TC of the ordinary temperature $NO_x$ adsorption catalyst 24 exceeds the activation temperature $TC_0$+constant temperature $\alpha$. When $TC \leq TC_0+\alpha$, the routine proceeds to step 103 where the flow switching valves 82 and 83 are held at the positions which are shown in FIG. 12 by the solid lines.

As opposed to this, when it is judged at step 102 that $TC>TC_0+\alpha$, the routine proceeds to step 104 where the flow switching valves 82 and 83 are held at the positions which are shown in FIG. 12 by the broken lines. Note that, in this case as well, before the catalyst 24 is activated, the air-fuel ratio is controlled to the stoichiometric air-fuel ratio or somewhat rich, while after the catalyst 24 is activated, the air-fuel ratio is controlled to the stoichiometric air-fuel ratio.

Figure 15:
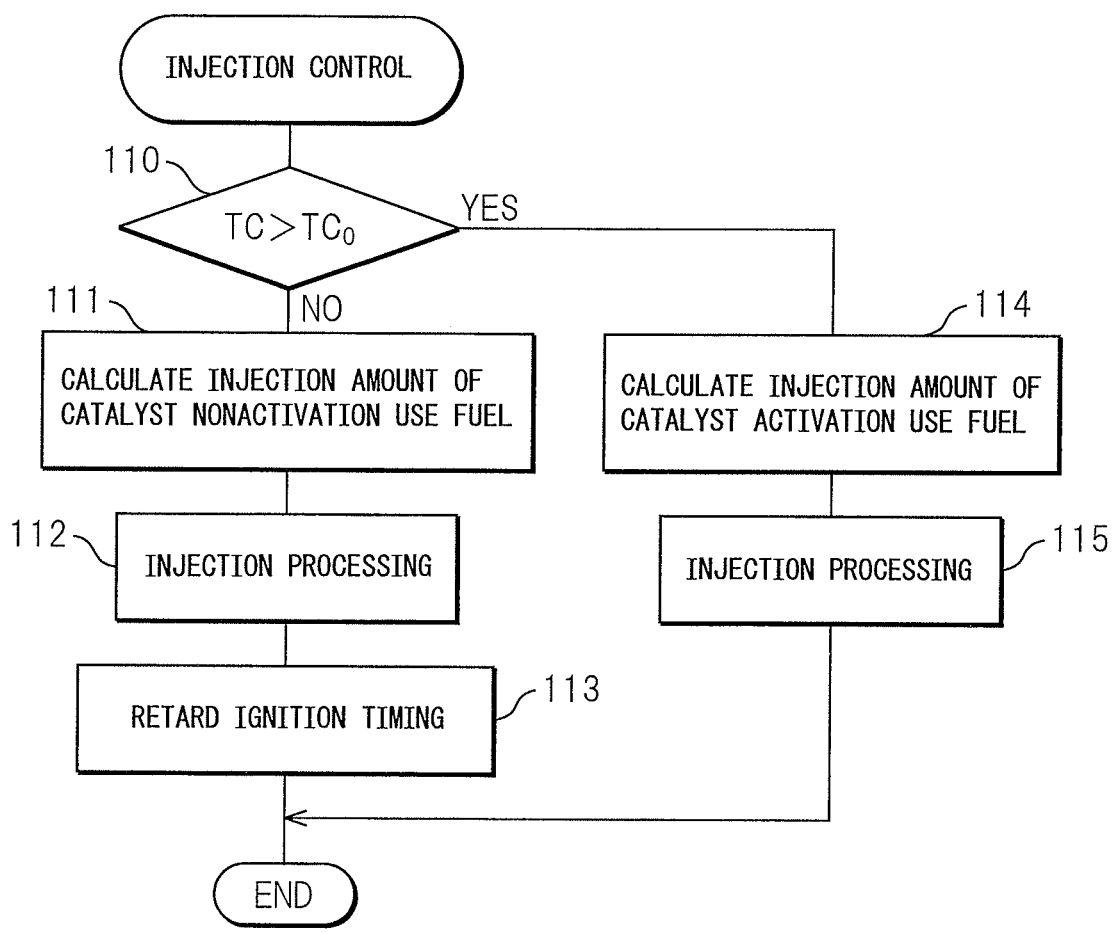
FIG. 15 is a flow chart for performing injection control of fuel.
Figure 16:
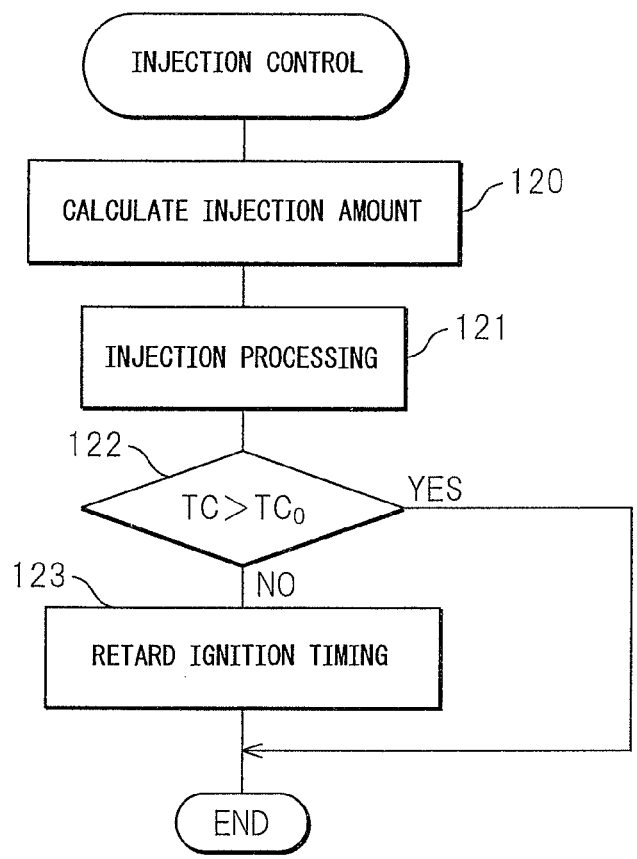
FIG. 16 is a flow chart for performing injection control of fuel.

FIG. 15 and FIG. 16 show an embodiment where after engine startup and until the ordinary temperature $NO_x$ adsorption catalyst 24 is activated, the ignition timing is retarded so as to make the high boiling point hydrocarbons and unsaturated hydrocarbons which are contained in the exhaust gas burn before flowing into the ordinary temperature $NO_x$ adsorption catalyst 24 and thereby keep the high boiling point hydrocarbons and unsaturated hydrocarbons from flowing into the ordinary temperature $NO_x$ adsorption catalyst 24.

That is, if retarding the ignition timing, the afterburn period becomes longer, so the high boiling point hydrocarbons and unsaturated hydrocarbons which are made to burn in the combustion chamber 5 and the exhaust passage leading to the catalyst 24 are increased and therefore the amount of high boiling point hydrocarbons and unsaturated hydrocarbons which flows into the ordinary temperature $NO_x$ adsorption catalyst 24 can be reduced.

On the other hand, in the internal combustion engine which is shown in FIG. 1, a reference ignition timing corresponding to the operating state of the engine after completion of engine warmup is preset. Therefore, in this embodiment, to make the high boiling point hydrocarbons and unsaturated hydrocarbons burn in the combustion chamber 5 or in the exhaust passage leading to the catalyst 24, after engine startup and until the ordinary temperature $NO_x$ adsorption catalyst 24 is activated, the ignition timing is retarded from the reference ignition timing.

FIG. 15 shows an injection control routine for working this embodiment.

Referring to FIG. 15, first, at step 110, it is judged based on the output signal of the temperature sensor 26 whether or not the temperature TC of the ordinary temperature $NO_x$ adsorption catalyst 24 exceeds the activation temperature $TC_0$.

When $TC \leq TC_0$, that is, when the catalyst 24 is not activated, the routine proceeds to step 111 where the amount of injection of the catalyst nonactivation use fuel, for example, compressed natural gas, is calculated. Next, at step 112, for example, compressed natural gas is injected from the second fuel injector 18. Next, at step 113, the ignition timing is retarded from the reference ignition timing.

As opposed to this, when it is judged at step 110 that $TC>TC_0$, that is, when it is judged that the catalyst 24 is activated, the routine proceeds to step 114 where the amount of injection of the catalyst activation use fuel, for example, the plant-derived alcohol fuel, is calculated. Next, at step 115, for example, plant-derived alcohol fuel is injected from the first fuel injector 17.

FIG. 16 shows the injection control routine in the case where only compressed natural gas, only a plant-derived alcohol fuel, only gasoline, or only a mixed fuel of a plant-derived alcohol and gasoline is used as the fuel irrespective of whether before activation of the catalyst 24 or after activation thereof.

Referring to FIG. 16, first, at step 120, the amount of injection of fuel is calculated. Next, at step 121, fuel injection processing is performed. Next, at step 122, it is judged based on the output signal of the temperature sensor 26 whether or not the temperature TC of the ordinary temperature $NO_x$ adsorption catalyst 24 exceeds the activation temperature $TC_0$. When $TC \leq TC_0$, that is, when the catalyst 24 is not activated, the routine proceeds to step 123 where the ignition timing is retarded from the reference ignition timing. Note that, in the case shown in each of FIG. 15 and FIG. 16 as well, before the catalyst 24 is activated, the air-fuel ratio is controlled to the stoichiometric air-fuel ratio or somewhat rich, while after the catalyst 24 is activated, the air-fuel ratio is controlled to the stoichiometric air-fuel ratio.

Figure 17:
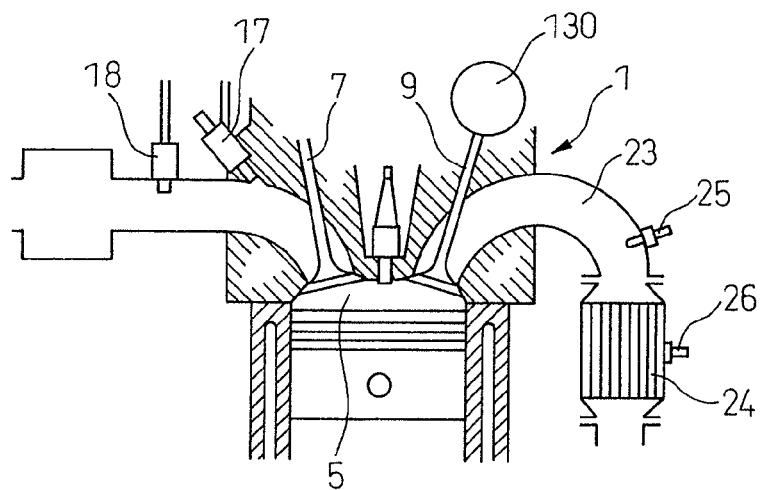
FIG. 17 is an overall view which shows still another embodiment of an internal combustion engine.
Figure 18:
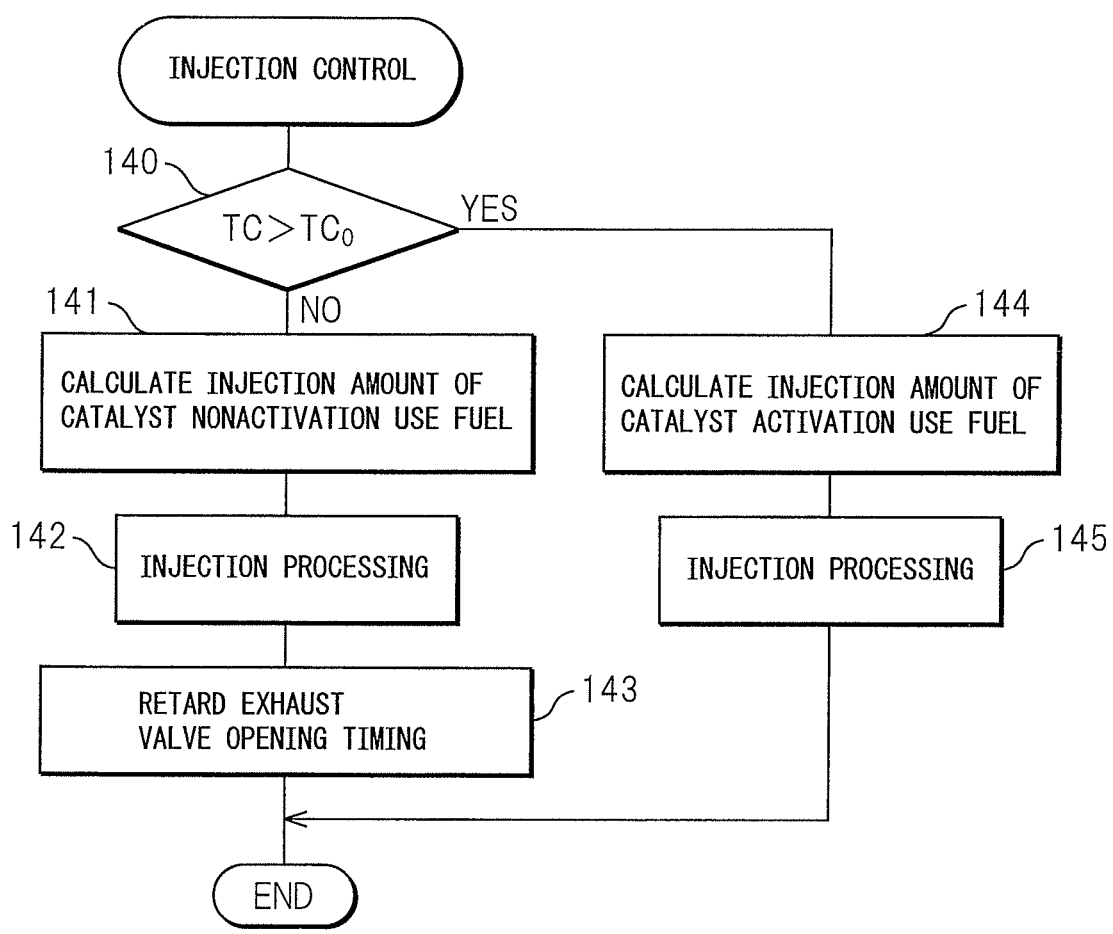
FIG. 18 is a flow chart for performing injection control of fuel.
Figure 19:
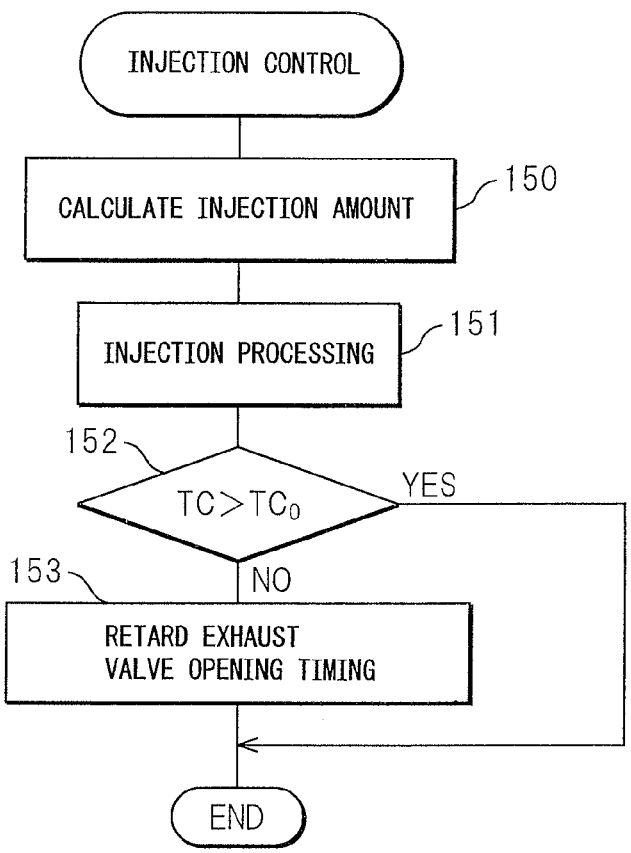
FIG. 19 is a flow chart for performing injection control of fuel.

FIG. 17 to FIG. 19 show an embodiment wherein after engine startup and until the ordinary temperature $NO_x$ adsorption catalyst 24 is activated, the opening timing of the exhaust valve 9 is retarded to thereby make the high boiling point hydrocarbons and unsaturated hydrocarbons which are contained in the exhaust gas burn before flowing into the ordinary temperature $NO_x$ adsorption catalyst 24 and thereby keep the high boiling point hydrocarbons and unsaturated hydrocarbons from flowing into the ordinary temperature $NO_x$ adsorption catalyst 24.

That is, if retarding the opening timing of the exhaust valve 9, the time period during which the high boiling point hydrocarbons and unsaturated hydrocarbons are made to burn in the combustion chamber 5 becomes longer. As a result, the high boiling point hydrocarbons and unsaturated hydrocarbons which are made to burn in the combustion chamber 5 are increased and therefore the amount of high boiling point hydrocarbons and unsaturated hydrocarbons which flow into the ordinary temperature $NO_x$ adsorption catalyst 24 can be reduced.

Therefore, in this embodiment, to make the high boiling point hydrocarbons and unsaturated hydrocarbons burn in the combustion chamber 5, after engine startup and until the ordinary temperature $NO_x$ adsorption catalyst 24 is activated, the opening timing of the exhaust valve 9 is retarded from a preset opening timing. Note that, in this embodiment, to control the opening timing of the exhaust valve 9, as shown in FIG. 17, a variable valve timing mechanism 130 is provided for the exhaust valve 9.

FIG. 18 shows an injection control routine for working this embodiment.

Referring to FIG. 18, first, at step 140, it is judged based on the output signal of the temperature sensor 26 whether or not the temperature TC of the ordinary temperature $NO_x$ adsorption catalyst 24 exceeds the activation temperature $TC_0$. When $TC \leq TC_0$, that is, when the catalyst 24 is not activated, the routine proceeds to step 141 where the amount of injection of the catalyst nonactivation use fuel, for example, compressed natural gas, is calculated. Next, at step 142, for example, compressed natural gas is injected from the second fuel injector 18. Next, at step 143, the opening timing of the exhaust valve 9 is retarded from the reference opening timing.

As opposed to this, when it was judged at step 140 that $TC > TC_0$, that is, when it is judged that the catalyst 24 is activated, the routine proceeds to step 144 where the amount of injection of the catalyst activation use fuel, for example, plant-derived alcohol fuel, is calculated. Next, at step 145, for example, plant-derived alcohol fuel is injected from the first fuel injector 17.

FIG. 19 shows the injection control routine in the case where only compressed natural gas, only a plant-derived alcohol fuel, only gasoline, or only a mixed fuel of a plant-derived alcohol and gasoline is used as the fuel irrespective of whether before activation of the catalyst 24 or after activation thereof.

Referring to FIG. 19, first, at step 150, the amount of injection of fuel is calculated. Next, at step 151, fuel injection processing is performed. Next, at step 152, it is judged based on the output signal of the temperature sensor 26 whether or not the temperature TC of the ordinary temperature $NO_x$ adsorption catalyst 24 exceeds the activation temperature $TC_0$. When $TC \leq TC_0$, that is, when the catalyst 24 is not activated, the routine proceeds to step 153 where the opening timing of the exhaust valve 9 is retarded from the reference opening timing. Note that, in the case shown in each of FIG. 18 and FIG. 19 as well, before the catalyst 24 is activated, the air-fuel ratio is controlled to the stoichiometric air-fuel ratio or somewhat rich, while after the catalyst 24 is activated, the air-fuel ratio is controlled to the stoichiometric air-fuel ratio.

Figure 20:
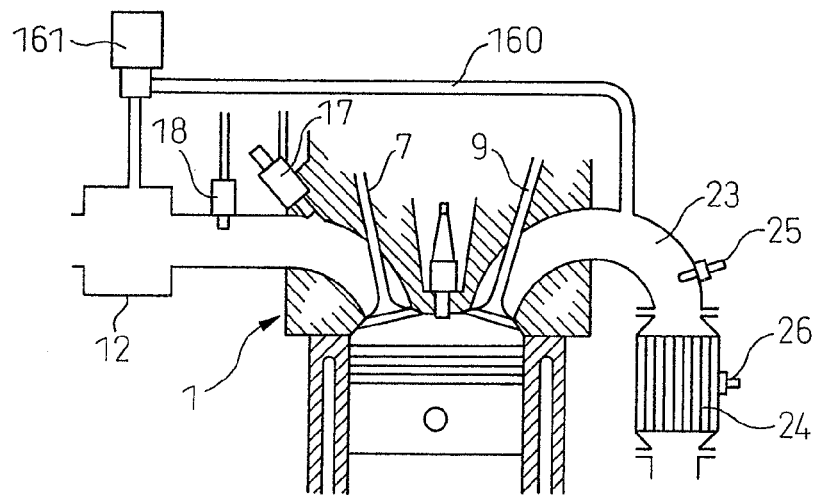
FIG. 20 is an overall view which shows still another embodiment of an internal combustion engine.

FIG. 20 shows still another embodiment. Referring to FIG. 20, in this embodiment, the surge tank 12 and the exhaust manifold 23 are connected through an exhaust gas recirculation (EGR) passage 160, and an EGR control valve 161 is arranged in the EGR passage 160. In this embodiment, after engine startup and until the ordinary temperature $NO_x$ adsorption catalyst 24 is activated, the EGR rate is made to increase so that the high boiling point hydrocarbons and unsaturated hydrocarbons which are contained in the exhaust gas are made to burn before flowing into the ordinary temperature $NO_x$ adsorption catalyst 24 and thereby the high boiling point hydrocarbons and unsaturated hydrocarbons are kept from flowing into the ordinary temperature $NO_x$ adsorption catalyst 24.

That is, if recirculating the exhaust gas, the high boiling point hydrocarbons and unsaturated hydrocarbons which are exhausted into the exhaust manifold 23 are recirculated into the combustion chamber 5. These high boiling point hydrocarbons and unsaturated hydrocarbons are made to burn in the combustion chamber 5. Therefore, if increasing the EGR rate, the high boiling point hydrocarbons and unsaturated hydrocarbons which are made to burn in the combustion chamber 5 increase and therefore the amount of high boiling point hydrocarbons and unsaturated hydrocarbons which flow into the ordinary temperature $NO_x$ adsorption catalyst 24 can be reduced.

On the other hand, in the internal combustion engine which is shown in FIG. 20, a reference EGR rate corresponding to the operating state of the engine after completion of engine warmup is preset. Therefore, in this embodiment, to make the high boiling point hydrocarbons and unsaturated hydrocarbons burn in the combustion chamber 5, after engine startup and until the ordinary temperature $NO_x$ adsorption catalyst 24 is activated, the EGR rate is made to increase over the reference EGR rate.

Figure 21:
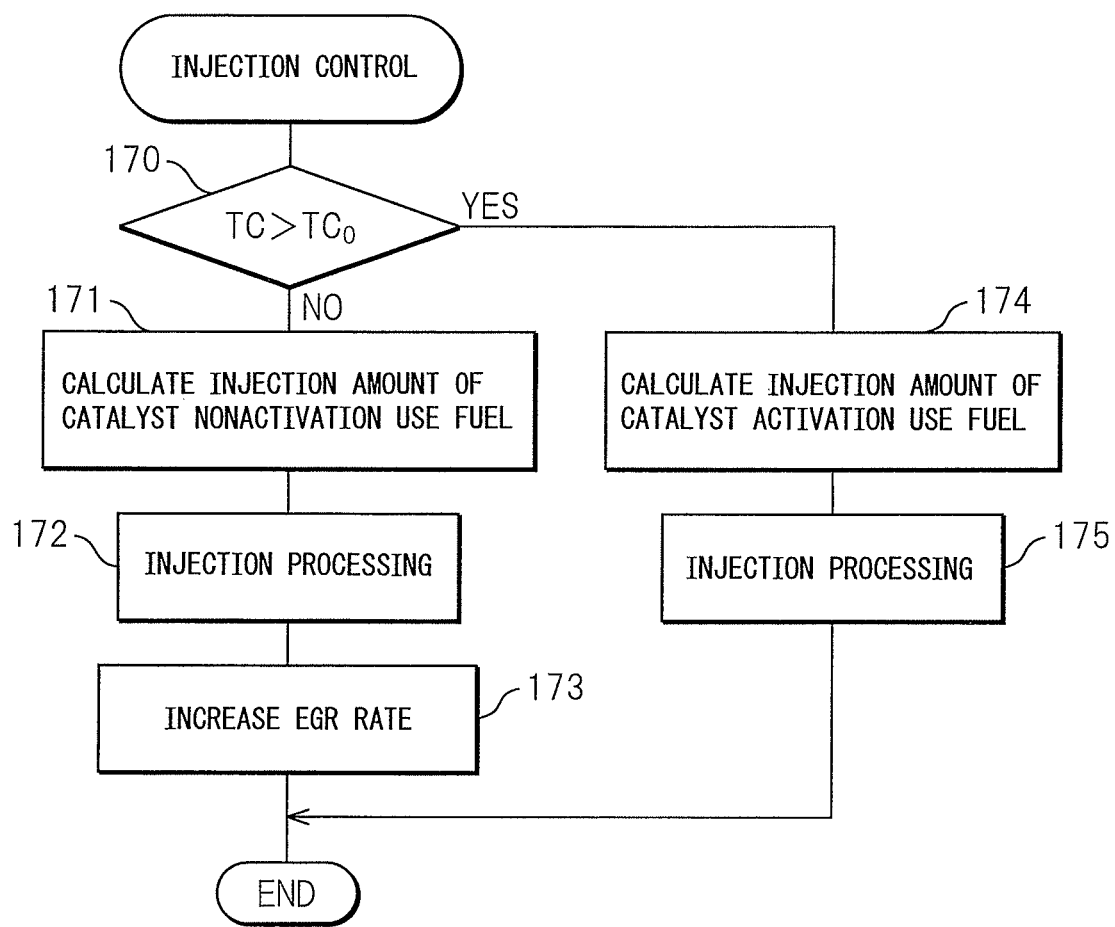
FIG. 21 is a flow chart for performing injection control of fuel.

FIG. 21 shows an injection control routine for working this embodiment.

Referring to FIG. 21, first, at step 170, it is judged based on the output signal of the temperature sensor 26 whether or not the temperature TC of the ordinary temperature $NO_x$ adsorption catalyst 24 exceeds the activation temperature $TC_0$. When $TC \leq TC_0$, that is, when the catalyst 24 is not activated, the routine proceeds to step 171 where the amount of injection of the catalyst nonactivation use fuel, for example, compressed natural gas, is calculated. Next, at step 172, for example, compressed natural gas is injected from the second fuel injector 18. Next, at step 173, the EGR rate is made to increase over the reference EGR rate.

As opposed to this, when it is judged at step 170 that $TC > TC_0$, that is, when it is judged that the catalyst 24 is activated, the routine proceeds to step 174 where the amount of injection of the catalyst activation use fuel, for example, the plant-derived alcohol fuel, is calculated. Next, at step 175, for example, a plant-derived alcohol fuel is injected from the first fuel injector 17.

Figure 22:
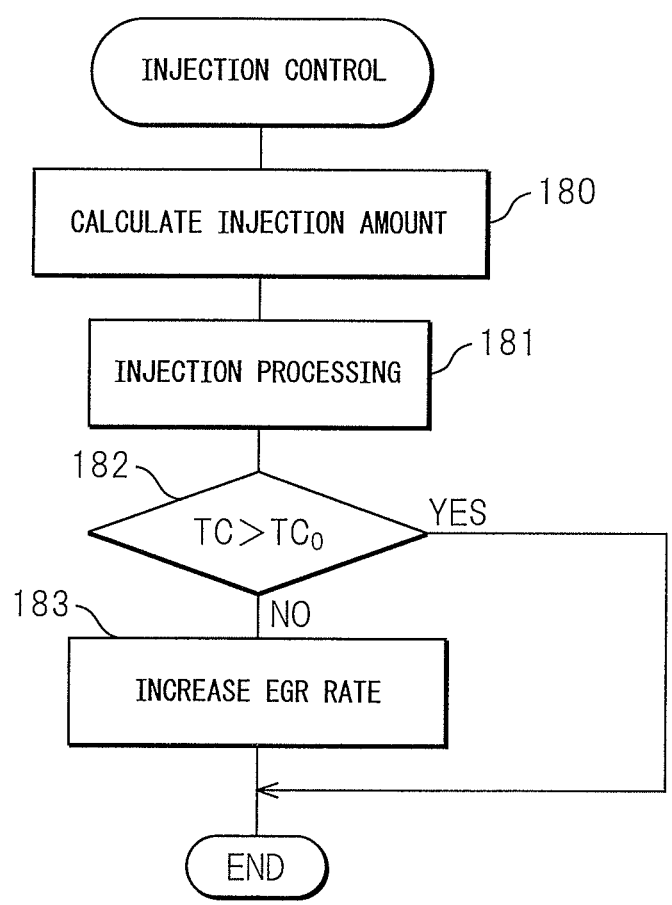
FIG. 22 is a flow chart for performing injection control of fuel.

FIG. 22 shows an injection control routine in the case where only compressed natural gas, only a plant-derived alcohol fuel, only gasoline, or only a mixed fuel of a plant-derived alcohol and gasoline is used as the fuel irrespective of whether before activation of the catalyst 24 or after activation thereof.

Referring to FIG. 22, first, at step 180, the amount of injection of fuel is calculated. Next, at step 181, the fuel injection processing is performed. Next, at step 182, it is judged based on the output signal of the temperature sensor 26 whether or not the temperature TC of the ordinary temperature $NO_x$ adsorption catalyst 24 exceeds the activation temperature $TC_0$. When $TC \leq TC_0$, that is, when the catalyst 24 is not activated, the routine proceeds to step 183 where the EGR rate is made to increase over the reference EGR rate. Note that, in the case shown in either of FIG. 21 and FIG. 22 as well, before the catalyst 24 is activated, the air-fuel ratio is controlled to the stoichiometric air-fuel ratio or somewhat rich, while after the catalyst 24 is activated, the air-fuel ratio is controlled to the stoichiometric air-fuel ratio.

REFERENCE SIGNS LIST

5 . . . combustion chamber
6 . . . spark plug
7 . . . intake valve
9 . . . exhaust valve
17 . . . first fuel injector
18 . . . second fuel injector
24 . . . ordinary temperature $NO_x$ adsorption catalyst

The invention claimed is:

1. An exhaust purification device of internal combustion engine comprising:
   a fuel comprising a first fuel and a second fuel;
   an electronic control unit; and
   a NOx adsorption catalyst arranged in an engine exhaust passage, the NOx adsorption catalyst being comprised of a carrier and a metal carried on the carrier and being able to adsorb NOx in a reference state,
      said carrier of the catalyst being comprised of an oxide of at least one metal element which is selected from Co, Fe, Cu, Ce, and Mn or a complex oxide which contains said metal element, the metal carried on said carrier being comprised of a metal which is selected from Cu, Co, Ag, Fe, Pt, Rh, and Pd and which is different from the metal contained in said carrier, said NOx adsorption catalyst having a property of adsorbing NOx in the presence of carbon monoxide in the reference state and having a property in which an action of adsorption of NOx is inhibited by an action of deposition or adsorption of hydrocarbons at the catalyst when the hydrocarbons in the exhaust gas flowing into the catalyst are unsaturated hydrocarbons or high boiling point hydrocarbons which become liquid in the reference state, said electronic control unit is configured to control a supply of said first fuel after said NOx adsorption catalyst is activated, and said electronic control unit is further configured to control a supply of said second fuel before said NOx adsorption catalyst is activated, said second fuel having fewer said high boiling point hydrocarbons and unsaturated hydrocarbons compared with said first fuel, and the electronic control unit is further configured to control the supply of said second fuel and is further configured to control an operation of the engine so that a concentration of carbon monoxide in the exhaust gas flowing into the catalyst is maintained at a concentration of more than the concentration which is required for adsorption of NOx until said NOx adsorption catalyst is activated after engine startup.

2. The exhaust purification device of internal combustion engine as claimed in claim 1 wherein said second fuel is comprised of compressed natural gas which has methane as its main ingredient.

3. The exhaust purification device of internal combustion engine as claimed in claim 1 wherein, an adsorbent or an additional adsorption catalyst, which adsorb said high boiling point hydrocarbons and unsaturated hydrocarbons, is arranged in the engine exhaust passage upstream of the NOx adsorption catalyst.

4. The exhaust purification device of internal combustion engine as claimed in claim 3 wherein, said additional adsorption catalyst and NOx adsorption catalyst are integrally formed.

5. The exhaust purification device of internal combustion engine as claimed in claim 1 wherein, a bypass passage is juxtaposed to the engine exhaust passage upstream of the NOx adsorption catalyst, an adsorbent or an additional adsorption catalyst, which adsorb said high boiling point hydrocarbons and unsaturated hydrocarbons, is arranged in said bypass passage, exhaust gas exhausted from the engine is fed to the NOx adsorption catalyst through said bypass passage until the NOx adsorption catalyst is activated after engine startup, and exhaust gas exhausted from the engine is fed to the NOx adsorption catalyst without routing the bypass passage after the NOx adsorption catalyst is activated.

6. The exhaust purification device of internal combustion engine as claimed in claim 1 wherein, a reference ignition timing corresponding to an operating state of the engine after completion of engine warmup is preset, and wherein an ignition timing is retarded from the reference ignition timing until the NOx adsorption catalyst is activated after engine startup.

7. The exhaust purification device of internal combustion engine as claimed in claim 1 wherein, an opening timing of an exhaust valve is retarded from a preset opening timing until the NOx adsorption catalyst is activated after engine startup.

8. The exhaust purification device of internal combustion engine as claimed in claim 1 wherein, a reference exhaust gas recirculation rate corresponding to an operating state of the engine after completion of engine warmup is preset, and an exhaust gas recirculation rate is made to increase over said reference exhaust gas recirculation rate until the NOx adsorption catalyst is activated after engine startup.

9. The Exhaust purification device of internal combustion engine as claimed in claim 1, wherein, when the concentration of carbon monoxide in the exhaust gas flowing into the catalyst becomes lower than the concentration which is required for adoption of $NO_x$, the concentration of carbon monoxide in the exhaust gas flowing into the catalyst is made higher by making an air-fuel ratio smaller.

10. The Exhaust purification device of internal combustion engine as claimed in claim 1, wherein, when the concentration of carbon monoxide in the exhaust gas flowing into the catalyst becomes lower than the concentration which is required for adoption of $NO_x$, the concentration of carbon monoxide in the exhaust gas flowing into the catalyst is made higher by retarding an ignition timing.

* * * * *